(No Model.)
L. BRADEN.
CULTIVATOR AXLE.
No. 358,917. Patented Mar. 8, 1887.
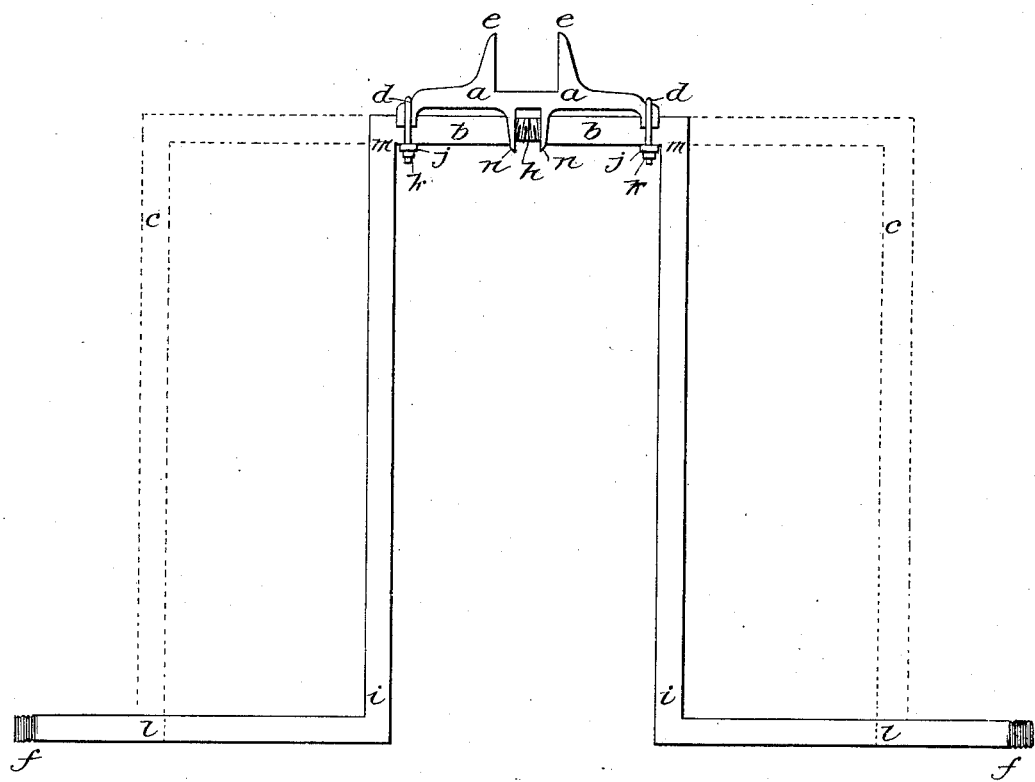
Witnesses.
Chas. M. Grant
Fr. A. Northway
Inventor:
Lincoln Braden

UNITED STATES PATENT OFFICE.

LINCOLN BRADEN, OF LAWRENCE, KANSAS.

CULTIVATOR-AXLE.

SPECIFICATION forming part of Letters Patent No. 358,917, dated March 8, 1887.

Application filed June 24, 1886. Serial No. 206,159. (No model.)

*To all whom it may concern:*

Be it known that I, LINCOLN BRADEN, of the city of Lawrence, in the county of Douglas, State of Kansas, have invented a new and useful Improvement in Cultivator and Stalk-Cutter Axles; and I do hereby declare that the following is a full, clear, and exact description of the construction and operation of the same, reference being had to the accompanying drawing, which forms a part of this specification.

The nature of my invention consists of an arched axle in two equal sections, each section being so constructed that its horizontal portions form right angles with its perpendicular portion, the two ends of each horizontal portion being unequal in length. Both horizontal and perpendicular portions are of any desirable length, one section of axle having a right-hand thread upon both its ends, and the other section a left-hand thread upon both its ends. The sections of axle are joined by means of a burr having threads to correspond with threads upon the ends of the sections.

My improvement consists, also, of a metal tongue-rest having two downward projections between which said burr is fixed. Each of said downward projections has a perforation through which the ends of sections pass into said burr. This tongue-rest also has horizontal arms parallel with the horizontal portions of the axle and at right angles with the tongue. The axle is held in place by means of these arms and two clamps made in the form of the letter U. Said clamps secure the horizontal arms projecting from the tongue-rest to the horizontal portions of the axle-sections.

In the accompanying drawing the lines from $ff$ to $ii$, from $ii$ to $mm$, and from $mm$ to $h$ show the axle as used in the cultivator. The lines from $ff$ to $ll$, the dotted lines from $ll$ to $mm$, and lines from $mm$ to $h$ show axle as used in a stalk-cutter.

By removing the ends $b$ $b$ of sections from the burr and reversing the sections by inserting the ends $ff$ the angles at $mm$ will be at $ll$ and angles $ii$ at $cc$. This will widen the space between the perpendiculars from $ii$ to $ll$. This space from $l$ to $l$ is necessary and sufficient for the use of this axle in a stalk-cutter. The space from $i$ to $i$ is necessary and sufficient for the use of this axle in a cultivator. The perpendicular projections $e$ $e$ hold the tongue in place upon its rests.

The arms $a$ $a$, the U shaped clamps $dd$, the plates $jj$, and taps $kk$, together with the downward-projecting arms $nn$, hold the axle in place and make the joint at $h$ inflexible.

What I claim as my invention, and wish to secure by Letters Patent, is—

1. An arched axle in two equal sections, said sections adapted to be reversed end for end, one section having a right-hand screw-thread upon each end, and the other section having a left-hand screw-thread upon each end, said sections being connected by a burr or other suitable means, substantially as shown and described.

2. A tongue-rest having two downward-projecting arms with perforations for the axle-sections and two horizontally-projecting arms at right angles to the tongue, in combination with the two axle-sections having unequal ends and adapted to be reversed and either end secured to said tongue-rest, substantially as shown and described.

LINCOLN BRADEN.

Witnesses:
F. A. NORTHWAY,
JAMES DE LONG.